(12) United States Patent
Elsayed et al.

(10) Patent No.: US 11,475,277 B2
(45) Date of Patent: Oct. 18, 2022

(54) ACCURATE AND INTERPRETABLE CLASSIFICATION WITH HARD ATTENTION

(71) Applicant: Google LLC, Mountain View, CA (US)

(72) Inventors: Gamaleldin Elsayed, Milpitas, CA (US); Simon Kornblith, Toronto (CA); Quoc V. Le, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 238 days.

(21) Appl. No.: 15/931,106

(22) Filed: May 13, 2020

(65) Prior Publication Data

US 2020/0364540 A1 Nov. 19, 2020

Related U.S. Application Data

(60) Provisional application No. 62/848,945, filed on May 16, 2019.

(51) Int. Cl.
*G06K 9/62* (2022.01)
*G06N 3/04* (2006.01)
*G06N 3/08* (2006.01)
*G06N 7/00* (2006.01)

(52) U.S. Cl.
CPC .......... *G06N 3/0454* (2013.01); *G06K 9/627* (2013.01); *G06K 9/6215* (2013.01); *G06K 9/6256* (2013.01); *G06N 3/084* (2013.01); *G06N 7/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,984,062 | B1* | 5/2018 | Strope | G06F 40/289 |
| 2010/0312730 | A1* | 12/2010 | Weng | G06N 3/02 |
| | | | | 706/15 |
| 2012/0218296 | A1* | 8/2012 | Belimpasakis | G06Q 30/0273 |
| | | | | 345/633 |
| 2017/0177972 | A1* | 6/2017 | Cricri | G06N 3/0445 |
| 2020/0082168 | A1* | 3/2020 | Fathi | G06V 20/176 |

(Continued)

OTHER PUBLICATIONS

Adebayo et al., "Sanity Checks for Saliency Maps", Thirty Second Conference on Neural Information Processing Systems, Dec. 2-8, 2018, Montreal, Canada, 11 pages.

(Continued)

*Primary Examiner* — Samir A Ahmed
(74) *Attorney, Agent, or Firm* — Dority & Manning, P.A.

(57) ABSTRACT

Generally, the present disclosure is directed to novel machine-learned classification models that operate with hard attention to make discrete attention actions. The present disclosure also provides a self-supervised pre-training procedure that initializes the model to a state with more frequent rewards. Given only the ground truth classification labels for a set of training inputs (e.g., images), the proposed models are able to learn a policy over discrete attention locations that identifies certain portions of the input (e.g., patches of the images) that are relevant to the classification. In such fashion, the models are able to provide high accuracy classifications while also providing an explicit and interpretable basis for the decision.

20 Claims, 8 Drawing Sheets

(56) References Cited

U.S. PATENT DOCUMENTS

2020/0160151 A1* 5/2020 Urtasun ................ G06V 20/56
2020/0285663 A1* 9/2020 Karn .................... G06N 3/0445

OTHER PUBLICATIONS

Ahmad, "Visit: A Neural Model of Covert Visual Attention", Advances in Neural Information Processing Systems 4, Dec. 2-5, 1991, Denver Colorado, pp. 420-427.

Andreas et al., "Neural Module Networks", $29^{th}$ IEEE Conference on Computer Vision and Pattern Recognition (CVPR), Jun. 26-Jul. 1, 2016, Las Vegas, NV, 10 pages.

Athalye et al., "Synthesizing Robust Adversarial Examples", $35^{th}$ International Conference on Machine Learning, Jul. 10-15, 2018, Stockholm, Sweden, 10 pages.

Ba et al., "Multiple Object Recognition", arXiv:1412.7755v1, Dec. 24, 2014, 10 pages.

Bach et al., "On Pixel-Wise Explanations for Non-Linear Classifier Decisions by Layer-Wise Relevance Propagation", PLOS ONE, vol. 10, No. 7, Jul. 10, 2015, 46 pages.

Baehrens et al., "How to Explain Individual Classification Decisions", Journal of Machine Learning Research, vol. 11, Jun. 2010, pp. 1803-1831.

Bahdanau et al., "Neural Machine Translation by Jointly Learning to Align and Translate", arXiv:1409.0473v4, Dec. 19, 2014, 15 pages.

Ballard et al., "The Rochester Robot", University of Rochester, Research Paper, 1988, 68 pages.

Ballard, "Reference Frames for Animate Vision", Proceedings of the Eleventh International Joint Conference on Artificial Learning (II), IJCAI-89, vol. 2, pp. 1635-1641.

Brendel et al., "Approximating CNNs with Bag-of-Local-Features Models Works Surprisingly Well on ImageNet", Seventh International Conference on Learning Representations, May 6-9, 2019, New Orleans, LA, 15 pages.

Burt, "Attention Mechanisms for Vision in a Dynamic World", Proceedings of the $9^{th}$ International Conference on Pattern Recognition, vol. 1, 1988, pp. 977-987.

Butko et al., "I-POMDP: An Infomax Model of Eye Movement", 2008 $7^{th}$ IEEE International Conference on Development and Learning, Aug. 9-12, 2008, Monterey, CA, 6 pages.

Chen et al., "SCA-CNN: Spatial and Channel-wise Attention in Convolutional Networks for Image Captioning", IEEE Conference on Computer Vision and Pattern Recognition, Jul. 21-26, 2017, Honolulu, HI, pp. 5659-5667.

Das et al,. "Human Attention in Visual Question Answering: Do Humans and Deep Networks Look at the Same Regions?", 2016 Conference on Empirical Methods in Natural Language Processing, Nov. 1-5, 2016, Austin Texas, pp. 932-937.

Eslami et al., "Attend, Infer, Repeat: Fast Scene Understanding with Generative Models", Thirtieth Conference on Neural Information Processing Systems, Dec. 5-10, 2016, Barcelona, Spain, 9 pages.

Fukui et al., "Attention Branch Network: Learning of Attention Mechanism for Visual Explanation", IEEE Conference on Computer Vision and Pattern Recognition (CVPR). Jun. 16-20, 2019, Long Beach, CA, pp. 10705-10714.

Girshick et al., "Rich feature hierarchies for accurate object detection and semantic segmentation", IEEE Conference on Computer Vision and Pattern Recognition (CVPR), Jun. 24-27, 2014, Columbus, Ohio, 8 pages.

Girshick, "Fast R-CNN". IEEE International Conference on Computer Vision (ICCV). Dec. 11-18, 2015, Santiago, Chile, pp. 1440-1448.

Goodale et al., "Separate visual pathways for perception and action", Trends in Neurosciences, vol. 15, No. 1, 1992, pp. 20-25.

Goodfellow et al., "Attacking Machine Learning with Adversarial Examples", Feb. 24, 2017, https://openai.com/blog/adversarial-example-research/, retrieved on Mar. 17, 2021, 7 pages.

Goodfellow et al., "Explaining and Harnessing Adversarial Examples", arXiv:1412.6572v1, Dec. 20, 2014, 10 pages.

Gregor et al., "DRAW: A Recurrent Neural Network for Image Generation", arXiv:1502.04623, May 20, 2015, 10 pages.

Hooker et al., "Evaluating Feature Importance Estimates", arXiv:1806.10758v1, Jun. 28, 2018, 12 pages.

Hu et al., "Squeeze-and-Excitation Networks", IEEE Conference on Computer Vision and Pattern Recognition, Jun. 18-22, 2018, Salt Lake City, Utah, pp. 7132-7141.

Huang et al., "GPipe: Efficient Training of Giant Neural Networks using Pipeline Parallelism", arXiv:1811.06965v4, Dec. 12, 2018, 11 pages.

Jaderberg et al., "Spatial Transformer Networks", Twenty-ninth Conference on Neural Information Processing Systems, Dec. 7-12, 2015, Montreal, Canada, 9 pages.

Jain et al., "Attention is not Explanation", 2019 Annual Conference of the North American Chapter of the Association for Computational Linguistics, Jun. 2-7, 2019, Minneapolis, MN, pp. 3543-3556.

Jetley et al., "Learn to Pay Attention", Sixth International Conference on Learning Representations, Apr. 30-May 3, 2018, Vancouver, Canada, 14 pages.

Kanopoulos et al., "Design of an linage Edge Detection Filter Using the Sobel Operator", IEEE Journal of Solid-State Circuits, vol. 23, No. 2, Apr. 1988, pp. 358-367.

Kindermans et al., "The (Un)Reliability of Saliency Methods", arXiv: 1711.00867v1, Nov. 2, 2017, 12 pages.

Kornblith et al., "Do Better ImageNet Models Transfer Better?". IEEE Conference on Computer Vision and Pattern Recognition (CVPR). Jun. 16-20, 2019, Long Beach, CA, pp. 2661-2671.

Larochelle et al., "Learning to combine foveal glimpses with a third-order Boltzmann machine", Twenty-fourth Annual Conference on Neural Information Processing Systems (NIPS), Dec. 6-11, 2010, Vancouver, Canada, 9 pages.

Linsley et al,. "Learning What and Where to Attend", Seventh International Conference on Learning Representations, May 6-9, 2019, New Orleans, LA, 21 pages.

Liu et al., "An intriguing failing of convolutional neural networks and the CoordConv solution", Thirty-second Conference on Neural Information Processing Systems (NeurIPS 2018), Dec. 2.-8, 2018, Montreal, Canada, 12 pages.

Liu et al., "Progressive Neural Architecture Search", European Conference on Computer Vision, EECV 2018, Sep. 8-14, 2018, Munich, Germany, 16 pages.

Lu et al., "Knowing When to Look: Adaptive Attention via a Visual Sentinel for Image Captioning", IEEE Conference on Computer Vision and Pattern Recognition, Jul. 21-26, 2017, Honolulu, HI, pp. 375-383.

Luo et al., "Foveation-Based Mechanisms Alleviate Adversarial Examples", arXiv:1511.06292v1, Nov. 19, 2015, 23 pages.

Luong et al., "Effective Approaches to Attention-based Neural Machine Translation", 2015 Conference on Empirical Methods in Natural Language Processing, Sep. 17-21, 2015, Lisbon Portugal, pp. 1412-1421.

Madry et al., "Towards Deep Learning Models Resistant to Adversarial Attacks", Sixth international Conference on Learning Representations, Apr. 30-May 3, 2018, Vancouver, Canada, 23 pages.

Mnih et al., "Recurrent Models of Visual Attention", Advances in Neural Information Processing Systems (NIPS), Dec. 8-13, 2014, Montreal, Canada, 9 pages.

Montavon et al., "Explaining nonlinear classification decisions with deep Taylor decomposition", Pattern Recognition, vol. 65, 2017, pp. 211-222.

Nguyen et al., "Synthesizing the preferred inputs for neurons in neural networks via deep generator networks", Thirtieth Conference on Neural Information Processing Systems, Dec. 5-10, 2016, Barcelona, Spain, 9 pages.

Olshausen et al.. "A Neurobiological Model of Visual Attention and Invariant Pattern Recognition Based on Dynamic Routing of Information", The Journal of Neuroscience, vol. 13. No. 11, Nov. 1993, pp. 4700-4719.

Papernot et al., "Technical Report on the cleverhans v2.1.0 Adversarial Examples Library", arXiv: 1610.00768v6, Jun. 27, 2018, 12 pages.

(56) References Cited

OTHER PUBLICATIONS

Real et al., "Regularized Evolution for Image Classifier Architecture Search", arXiv:1802.01548v6, Oct. 26, 2018, 16 pages.
Ren et al., "Faster R-CNN: Towards Real-Time Object Detection with Region Proposal Networks", Twenty-ninth Conference on Neural Information Processing Systems (NeurIPS), Dec. 7-12, 2015, Montreal, Canada, 9 pages.
Rennie et al., "Self-critical Sequence Training for Image Captioning", , IEEE Conference on Computer Vision and Pattern Recognition, Jul. 21-26, 2017, Honolulu, HI, pp. 7008-7024.
Rudin, "Stop Explaining Black Box Macliine Learning Models for High Stakes Decisions and Use Interpretable Models Instead", arXiv:1811.10154v3, Sep. 22, 2019, 20 pages.
Schmidhuber et al., "Learning to Generate Artificial Fovea Trajectories for Target Detection", International Journal of Neural Systems, vol. 2, No. 1 & 2, 1991, 11 pages.
Schmidhuber et al., "Learning to generate focus trajectories for attentive vision", Technical University of Munich—Informatics, Report, Apr. 1990, 18 pages.
Schmidhuber et al., "Using Adaptive Sequential Neurocontrol for Efficient Learning of Translation and Rotation Invariance", Artificial Neural Networks, 1991, 6 pages.
Schutz et al., "Eye movements and perception: A selective review", Journal of Vision, vol. 11(5), No. 9, Sep. 14, 2011, 30 pages.
Seibert et al., "Spreading Activation Layers, Visual Saccades, and Invariant Representations for Neural Pattern Recognition Systems", Neural Networks, vol. 2, 1989, pp. 9-27.
Sermanet et al., "Attention for Fine Grained Categorization", arXiv:1412.7054v3. Apr. 11, 2015, 11 pages.
Simonyan et al., "Very Deep Convolutional Networks for Large-Scale Image Recognition", arXiv:1409.1556v5, Dec. 23, 2014, 13 pages.
Spall, "Multivariate Stochastic Approximation Using a Simultaneous Perturbation Gradient Approximation", IEEE Transactions on Automatic Control, vol. 37, No. 3, Mar. 1992, pp. 332-341.
Springenberg et al., "Striving for Simplicity: The All Convolutional Net", arXiv:1412.6806v1, Dec. 21, 2014, 12 pages.
Sutton et al., "Policy Gradient Methods for Reinforcement Learning with Function Approximation", $12^{th}$ International Conference on Neural Information Processing Svstems, Nov. 29-Dec. 4, 1999, Denver, Colorado, pp. 1057-1063.
Szegedy et al., "Intriguing properties of neural networks", arXiv:1312.6199v1, Dec. 21, 2013, 9 pages.
Uesato et al., "Adversarial Risk and the Dangers of Evaluating Against Weak Attacks", $35^{th}$ International Conference on Macliine Learning, Jul. 10-15, 2018, Stockholm, Sweden, 10 pages.
Uijlings et al., "Selective Search for Object Recognition", International Journal of Computer Vision, vol. 104, No. 2, Sep. 2013, 14 pages.
Vaswani et al., "Attention Is All You Need", $31^{st}$ Conference on Neural Information Processing Systems (NIPS 2017), Dec. 4-9, 2017, Long Beach. CA, 11 pages.
Wandell, "Foundations of Visions", Stanford University, 1995, 355 pages.
Wang et al., "Residual Attention Network for Image Classification", IEEE Conference on Computer Vision and Pattern Recognition, Jul. 21-26, 2017, Honolulu, HI, pp. 3156-3164.
Williams, "Simple Statistical Gradient-Following Algorithms for Connectionist Reinforcement Learning", Machine Learning, vol. 8, 1992, pp. 229-256.
Woo et al., "CBAM: Convolutional Block Attention Module", European Conference on Computer Vision (ECCV), Sep. 8-14, 2018, Munich, Germany, 17 pages.
Xie et al., "Feature Denoising for Improving Adversarial Robustness", IEEE Conference on Computer Vision and Pattern Recognition, Jun. 16-20, 2019, Long Beach, CA, pp. 501-509.
Xu et al., "Show, Attend and Tell: Neural Image Caption Generation with Visual Attention", Proceedings of Machine Learning Research, vol. 37, 2015, 10 pages.
Yosinski et al,. "Understanding Neural Networks Through Deep Visualization", arXiv:1506.06579v1, Jun. 22, 2015, 12 pages.
You et al., "Image Captioning with Semantic Attention", $29^{th}$ IEEE Conference on Computer Vision and Pattern Recognition (CVPR), Jun. 26-Jul. 1, 2016, Las Vegas, NV, pp. 4651-4659.
Zeiler et al., "Visualizing and Understanding Convolutional Networks", $13^{th}$ European Conference on Computer Vision (ECCV), Sep. 6-12, 2014, Zurich, Switzerland, 16 pages.
Zheng et al., "A Neural Autoregressive Approach to Attention-based Recognition", International Journal of Computer Vision, vol. 113, Sep. 13, 2014, 17 pages.
Zhou et al., "Learning Deep Features for Discriminative Localization", $29^{th}$ IEEE Conference on Computer Vision and Pattern Recognition (CVPR), Jun. 26-Jul. 1, 2016, Las Vegas, NV, pp. 2921-2929.
Zintgraf et al., "Visualizing Deep Neural Network Decisions: Prediction Difference Analysis", arXiv:1702.04595v1, Feb. 15, 2017, 12 pages.
Zoph et al., "Learning Transferable Architectures for Scalable Image Recognition", IEEE Conference on Computer Vision and Pattern Recognition, Jun. 18-22, 2018, Salt Lake City, Utah, pp. 8697-8710.

\* cited by examiner

FINAL CLASSIFICATION: 'INDIAN COBRA' WITH HARD ATTENTION SHOWN VIA BOXES AROUND ATTENDED IMAGE PORTIONS.

ACCURATE AND INTERPRETABLE CLASSIFICATION WITH HARD ATTENTION

RELATED APPLICATIONS

This application claims priority to U.S. Provisional Patent Application No. 62/848,945, filed May 16, 2019. U.S. Provisional Patent Application No. 62/848,945 is hereby incorporated by reference in its entirety.

FIELD

The present disclosure relates generally to machine learning. More particularly, the present disclosure relates to machine-learned models and training techniques therefor that are capable of generating classifications for inputs (e.g., images) using hard attention, thereby improving the interpretability of the classifications.

BACKGROUND

Artificial neural networks and other machine-learned models achieve state-of-the-art performance across many different tasks, including classification tasks. For example, convolutional neural networks (CNNs) achieve state-of-the-art performance across many image classification tasks. However, because neural networks such as CNNs compute a nonlinear function of the input, their decisions are difficult to interpret.

Thus, despite the success of convolutional neural networks (CNNs) across many computer vision tasks, they have been slowly deployed in some critical applications, largely due to the inability to interpret CNN predictions. In particular, CNNs compute very complex functions of their inputs, which make it unclear what aspects of the input contributed to the prediction.

Although many researchers have attempted to design methods to interpret CNN and other machine-leaned model decisions, it is unclear whether these explanations faithfully describe the models that they are intended to explain. Additionally, adversarial machine learning research has demonstrated that small changes to pixels of the image can change classifier decisions, which underscores the unintuitive nature of CNN classifiers.

One interesting class of models that offers more interpretable decisions are "hard" visual attention models. These models often rely on a controller that selects relevant parts of the input to contribute to the decision, which provides interpretability by design. These models are inspired by human vision, where the fovea and visual system process only a limited portion of the visual scene at high resolution, and top-down pathways control eye movements to sequentially sample salient parts of visual scenes.

Although models with hard attention perform well on simple datasets such as MNIST, it has been challenging to scale these models from small tasks to real world images. Furthermore, training hard attention models with only class label supervision is challenging. For example, in large scale images, the action space is high dimensional and the reward is sparse which often leads to failure of the optimization process.

SUMMARY

Aspects and advantages of embodiments of the present disclosure will be set forth in part in the following description, or can be learned from the description, or can be learned through practice of the embodiments.

One example aspect of the present disclosure is directed to a computer system that performs classification with hard attention. The computing system includes a machine-learned classification model. The machine-learned classification model includes a representation model configured to receive and process an input that comprises a plurality of portions to generate a plurality of sets of features respectively for the plurality of portions of the input. The machine-learned classification model includes a classification model configured to receive and process the plurality of sets of features to generate respective classification data for each of the plurality of portions of the input. The machine-learned classification model includes an attention model configured to receive and process the plurality of sets of features to select, at each of one or more iterations, an attended portion of the plurality of portions of the input. At each of the one or more iterations, the machine-learned classification model is configured to output a respective prediction that comprises the respective classification data for the attended portion of the input selected by the attention model at such iteration. The computing system includes one or more processors and one or non-transitory computer-readable media that store instructions that, when executed by the one or more processors cause the computer system to perform operations. The operations include obtaining the input that comprises the plurality of portions. The operations include inputting the input into the machine-learned classification model. The operations include receiving, at each of the one or more iterations, the respective prediction as an output of the machine-learned classification model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
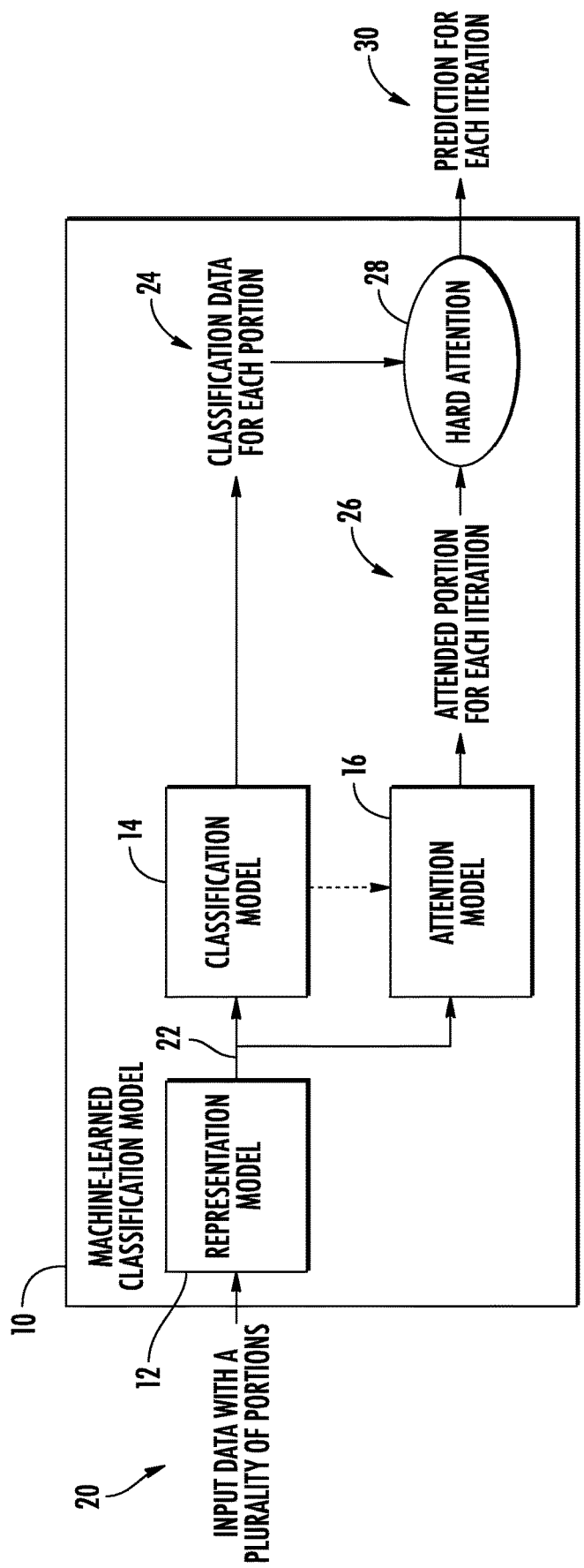
FIG. 1 depicts a block diagram of an example machine-learned classification model according to example embodiments of the present disclosure.

Reference numerals that are repeated across plural figures are intended to identify the same features in various implementations.

DETAILED DESCRIPTION

Overview

Generally, the present disclosure is directed to novel machine-learned classification models that operate with hard attention to make discrete attention actions. The present disclosure also provides a self-supervised pre-training procedure that initializes the model to a state with more frequent rewards. Given only the ground truth classification labels for a set of training inputs (e.g., images), the proposed models are able to learn a policy over discrete attention locations that identifies certain portions of the input (e.g., patches of the images) that are relevant to the classification. In such fashion, the models are able to provide high accuracy classifications while also providing an explicit and interpretable basis for the decision.

More particularly, models that employ hard attention make decisions based on only a subset of an input (e.g., a subset of pixels in an input image). In computer vision or other image processing applications, this typically takes the form of a series of square "glimpses" of the image.

Models with hard attention are difficult to train with gradient-based optimization. To make training more tractable, other models have resorted to soft attention. Typical soft attention mechanisms rescale features at one or more stages of the network. The soft masks used for rescaling often appear to provide some insight into the model's decision-making process, but the model's final decision may nonetheless rely on information provided by features with small weights.

In contrast, the present disclosure proposes a novel hard visual attention model and a novel training procedure to train that model. The proposed model and training procedure overcomes the problems of high dimensionality and sparse rewards that make hard attention models hard to optimize. The proposed model finely discretizes the action space to many portions (e.g., overlapping portions of an input image), which allows attending to relevant features in the input (e.g., image) while overcoming the complexity of dealing with continuous action spaces. In some implementations, the model can be trained using a pretraining procedure to precondition the model to a good initial point where reward is not sparse for the policy gradient optimization.

The present disclosure provides a number of technical effects and benefits. As one example technical effect and benefit, the machine-learned classification models described herein operate to provide a classification with hard attention outputs. Thus, the portions of the input that were relied upon to arrive at the classification are explicitly identified. This makes the classification provided by the model much more interpretable to humans, which enables the application of the classification model to various problems to be significantly more viable. That is, for certain problems where the basis for decisions are required or should be interpretable, machine learning technology has not been previously applied and, therefore, its resulting benefits such as speed of inference and high accuracy have not been received. As such, the system and methods of the present disclosure allow for the more widespread use of machine learning and, therefore, enable improved processing speed and prediction accuracy to be achieved for new domains and use cases. Furthermore, the systems and methods of the present disclosure provide for classifications with state-of-the art accuracy relative to other hard attention approaches. Thus, more accurate classifications can be produced which enable downstream processes to operate with increased accuracy and efficiency.

As another example technical effect and benefit, in the past, the training of hard attention models without attention supervision has been challenging, resulting in low accuracy and poor attention locations. The difficulty stems from the fact that it is hard to explicitly quantify what are the salient places in an image for a given decision. For example, in large scale images such as ImageNet, the action space is high dimensional and the reward is sparse which often leads to failure of the optimization process. Failure of the optimization process results in wasted computing resources such as processor usage, memory usage, and network usage. However, the present disclosure provides a pretraining procedure that can be used to precondition the model to a good initial point where reward is not sparse for the policy gradient optimization. This results in the optimization process having a much greater rate of success. As such, the systems and methods of the reduce consumption of computing resources such as processor usage, memory usage, and network usage.

U.S. Provisional Patent Application No. 62/848,945 describes example implementations of the systems and methods of the present disclosure as well as example experimental results for such example implementations. U.S. Provisional Patent Application No. 62/848,945 is fully incorporated into and forms a portion of the present disclosure.

With reference now to the Figures, example embodiments of the present disclosure will be discussed in further detail.

Example Machine-Learned Models

FIG. 1 depicts a block diagram of an example machine-learned classification model 10 according to example embodiments of the present disclosure. The example machine-learned classification model 10 is configured to receive a set of input data 20 that includes a plurality of portions. The machine-learned classification model 10 is configured to process the input data 20 to produce, for each of one or more iterations, a prediction 30 for each iteration.

The input data 20 can describe any type of input including, as examples, image data, audio data, and/or textual data. The portions of the input data 20 can be overlapping or non-overlapping. As one example, the portions of the input data 20 can include overlapping patches of an image. As another example, the portions of the input data 20 can include portions (e.g., words, phonemes, n-grams, graphemes, or other portions) of text data. As another example, the portions of the input data 20 can include embeddings or other pre-processed representations of portions of an input. As yet another example, the portions of the input data 20 can include portions of sensor data generated by one or more sensors.

The prediction 30 for each iteration can include a classification for the input data 20 relative to a number of classes (e.g., along with identification of specific one of the portions of the input data 20 that led to such classification). The classification can be a binary classification or can take the form of a confidence score, probability value, or other numerical representation of the classification.

According to an aspect of the present disclosure, the machine-learned classification model 10 can include a representation model 12, a classification model 14, and an attention model 16. Each of the models 12, 14, and 16 can be or include various types of machine-learned models, as are described elsewhere herein, including but not limited to artificial neural networks (hereafter simply "neural networks"). Example neural networks include convolutional neural networks.

The representation model 12 can be configured to receive and process the input data 20 that includes the plurality of portions to generate a plurality of sets of features 22 respectively for the plurality of portions of the input data 20. Thus, one set of features 22 can be generated for each portion of the input data 20.

The classification model 14 can be configured to receive and process the plurality of sets of features 22 to generate respective classification data 24 for each of the plurality of portions of the input. For example, the respective classification data 24 produced by the classification model 14 for each of the plurality of portions of the input 20 can be or include a logit vector that provides values for each of a number of candidate classification labels.

The attention model 16 can be configured to receive and process the plurality of sets of features 22 to select, at each of the one or more iterations, an attended portion 26 of the plurality of portions of the input. As illustrated in FIG. 1, in some implementations, the attention model 16 can also receive data from the classification model 14 (e.g., internal representations from the classification model 14 which may be referred to as an intermediate classification) and the attention model 16 can use such data in furtherance of selecting the attended portion 26 for each iteration.

At each of the one or more iterations, the machine-learned classification model 10 can be configured to output the respective prediction 30 that comprises the respective classification data 24 for the attended portion 26 of the input selected by the attention model 16 at such iteration. For example, at each iteration, a hard attention operation 28 can be performed to select the classification data 24 that is associated with the attended portion 26 selected by the attention model 16.

As described elsewhere herein, in some implementations, a final classification can be generated from the predictions 30 for all of the iterations. As one example, generating the final classification can include averaging the respective predictions 30 received for the one or more iterations to obtain an averaged prediction; and selecting a highest scoring class from the averaged prediction as the final classification.

Figure 2:
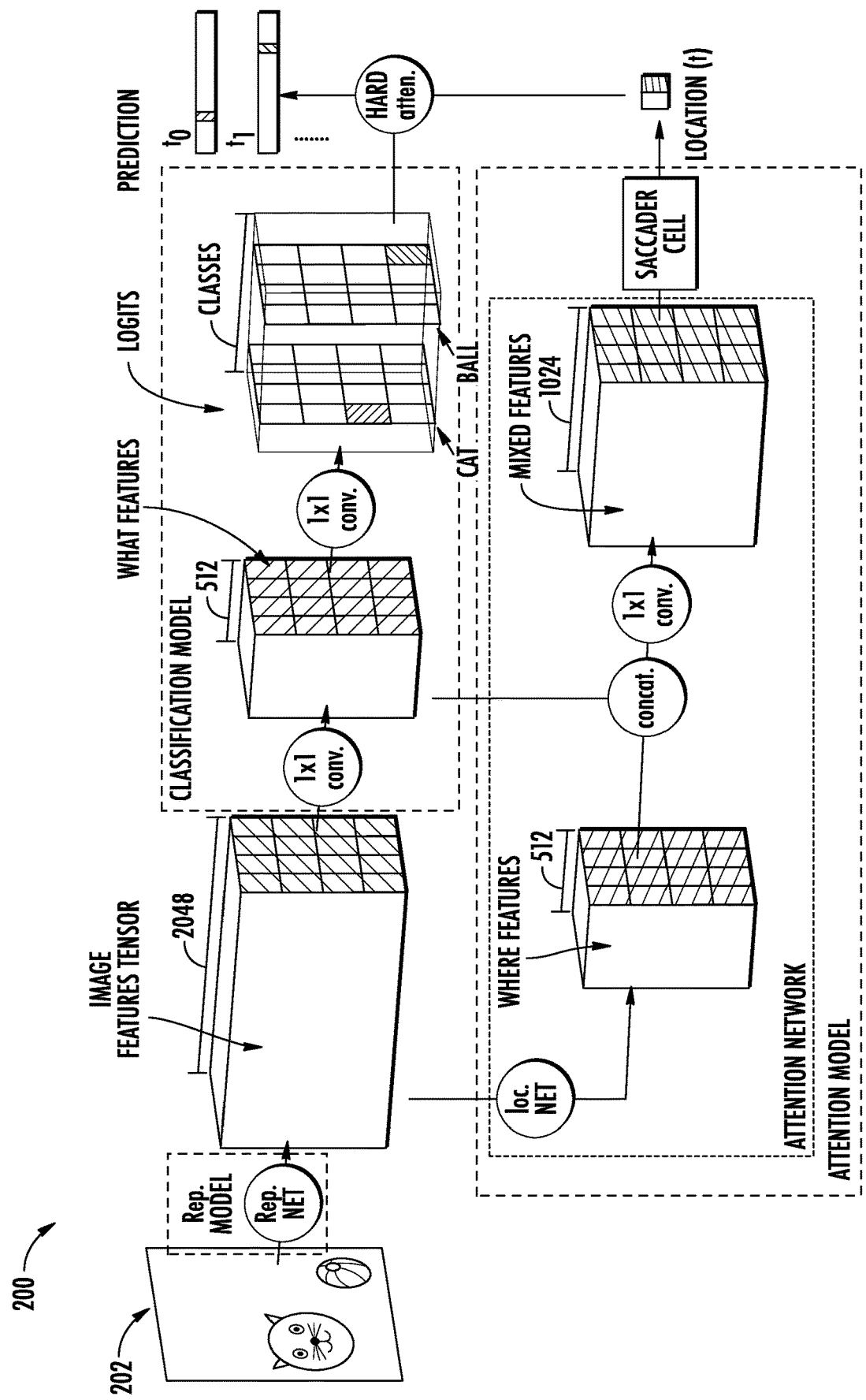
FIG. 2 depicts a block diagram of an example machine-learned classification model according to example embodiments of the present disclosure.

As another example, FIG. 2 depicts a block diagram of an example machine-learned classification model 200 according to example embodiments of the present disclosure. Similar to the example model 10 of FIG. 1, the machine-learned classification model 200 of FIG. 2 includes a representation model, a classification model, and an attention model. The machine-learned classification model 200 of FIG. 2 operates to produce one or more predictions for an image 202.

In particular, to understand the intuition behind the illustrated model architecture, imagine one uses a trained image classification model and applies it at different locations of an image to obtain logits vectors at different locations. To find the correct label, one could average the logits at the different locations, and to find a salient location on the image, one could pick the image patch the elicits the largest response on the correct label channel.

More particularly, as illustrated in FIG. 2, the representation model can include a representation network. The representation network can be a convolutional neural network that learns features from patches at different locations of the image 202. In some implementations, any convolutional network with limited receptive field can be used to scan different parts of the image 202 to form image features at different locations, which are illustrated in FIG. 2 as the "image features tensor." As one example, the "BagNet" architecture can enable learning of these representations efficiently without scanning in one pass. As an example, a ResNet architecture can be used where most 3×3 convolutions are replaced with 1×1 convolutions in order to limit the receptive field of the model and strides are adjusted to obtain a higher resolution output. One example representation network has a receptive field of size 63×63 and computes 2048 features vectors at different places in the image 202 separated by only 8 pixels. For images of size 224×224 this maps to 361 possible attention locations in an image.

The example classification model illustrated in FIG. 2 can perform a 1×1 convolution with ReLU activation to encode the image feature representations into a 512-dimensional feature space (shown in FIG. 2 as the "what" features). The classification model can then apply another 1×1 convolution to produce the 1000-dimensional logits tensor for classification. Introducing this 512-dimensional bottleneck can provide a small performance improvement over the original BagNet model.

The attention model can include an attention network and a saccader cell. The attention network can be configured to receive and process the image features tensor (and, optionally, the what features) to produce an intermediate attention representation (illustrated in FIG. 2 as the "mixed features"). In particular, as illustrated in FIG. 2, the attention network can include a convolutional network (shown as the "location network") that operates on the 2048 image features tensor. As one example, the location network can include six convolutional layers alternating between 3×3 and 1×1 convolutional layers each followed by batch normalization and ReLU activation. The dimensionality can be reduced every two layers, from 2048 to 1024 to 512 location features (e.g., shown as the "where" features). The what and where features can then be concatenated and mixed using a linear 1×1 convolutional layer to a tensor with 1024 features (F) (e.g., shown as the "mixed features").

The saccader cell can be configured to, for each of one or more iterations: obtain the intermediate attention representation (e.g., the "mixed features") and produce a location, which may, for example, correspond to a specific one of the portions of the input. For each iteration, a hard attention operation can be performed for the location and the logits to produce the prediction for such iteration.

Figure 3:
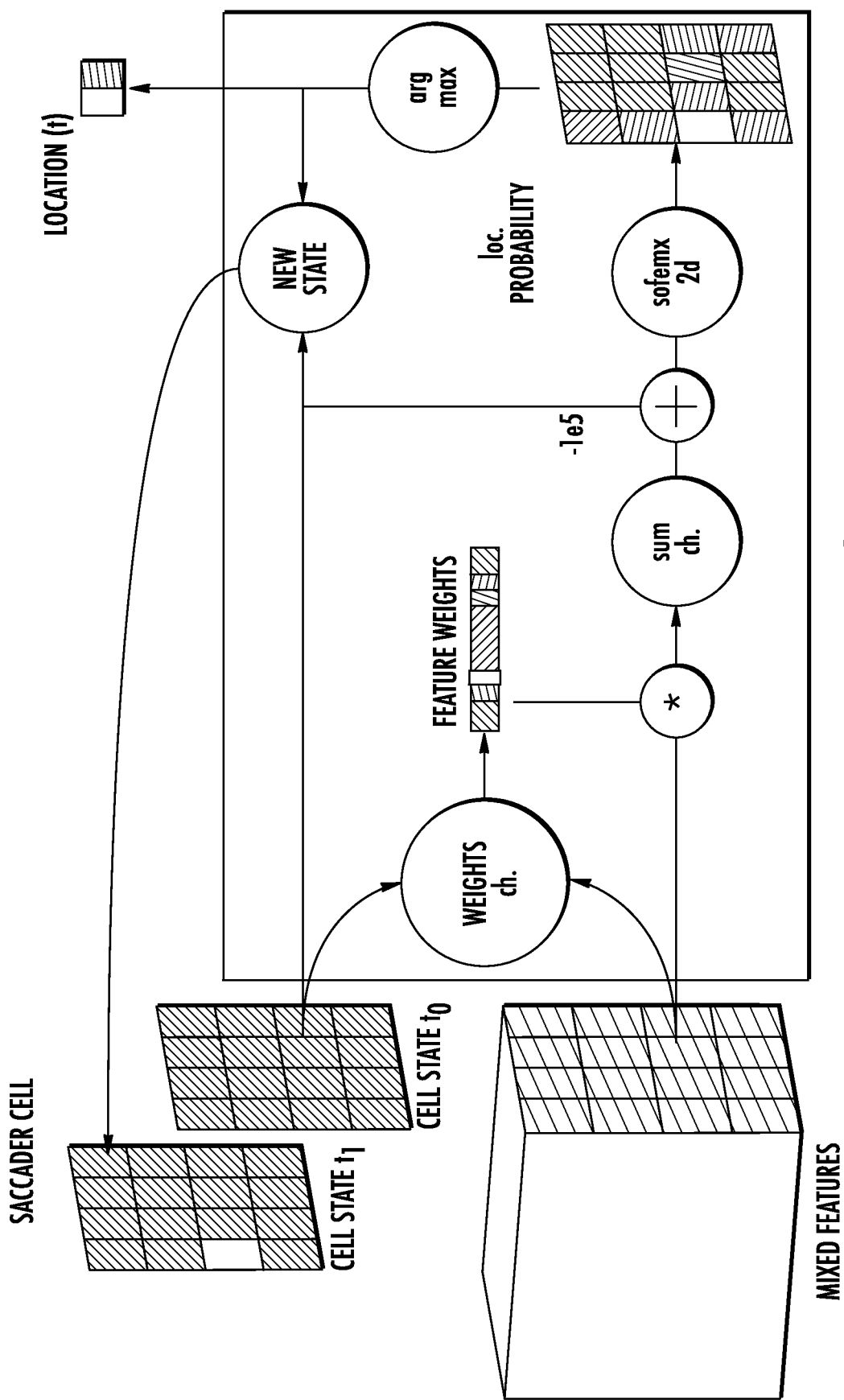
FIG. 3 depicts a block diagram of an example saccader cell according to example embodiments of the present disclosure.

In particular, as an example, FIG. 3 depicts a block diagram of an example saccader cell according to example embodiments of the present disclosure. As illustrated in FIG. 3, at each iteration the saccader call can: obtain the intermediate attention representation (e.g., the "mixed features") and obtain a cell state associated with a most recent iteration. The cell state can identify which portions of the input have been selected as attended portions in previous iterations. Next, at each iteration, the saccader cell can combine the intermediate attention representation and the cell state associated with the previous iteration to produce a location probability distribution over the plurality of portions of the input; select the attended portion based on the location probability distribution; and update the cell state for use in a next iteration based on the attended portion.

In some implementations, the saccader cell can be configured to combine the intermediate attention representation and the cell state associated with the previous iteration such that the location probability distribution is effectively zero for portions that have been selected as attended portions in previous iterations More particularly, as one example illustrated in FIG. 3, the saccader cell can take the mixed what and where features F and output a location to saccade to at each iteration. The cell can include a 2D state ($C^t$) that keeps track of the visited locations until iteration t by placing 1 in the corresponding location in the cell state. This cell state can be used to prevent the network from returning to previously seen locations. The saccader cell can first select relevant spatial locations from F and then select feature channels based on the relevant locations:

$$G_{ijk}^t = \frac{F_{ijk} a_k}{\sqrt{d}} - 10^5 C_{ij}^{t-1} \quad \tilde{G}_{ijk}^t = \frac{\exp(G_{ijk}^t)}{\sum_{m=1}^{h} \sum_{n=1}^{w} \exp(G_{mnk}^t)} \quad (1)$$

$$h_k^t = \sum_{i=1}^{h} \sum_{j=1}^{w} F_{ijk} \tilde{G}_{ijk}^t \quad \tilde{h}_k^t = \frac{\exp(h_k^t)}{\sum_{p=1}^{d} \exp(h_p^t)} \quad (2)$$

where h and w are the height and width of the output features from the representation network, d is the dimensionality of the mixed features, and $a \in R^d$ is a trainable vector. A large negative number multiplied by the state (e.g., $-10^5 C_{ij}^{t-1}$) can be used to mask out previously used locations. Next, the saccader cell can compute a weighted sum of the feature channels and performs a spatial softmax:

$$R_{ij}^t = \sum_{k=1}^{d} F_{ijk} \tilde{h}_k^t - 10^5 C_{ij}^{t-1} \quad \tilde{R}_{ij}^t = \frac{\exp(R_{ij}^t)}{\sum_{m=1}^{h} \sum_{n=1}^{w} \exp(R_{mn}^t)} \quad (3)$$

$\tilde{R}$ reflects the model's policy over glimpse locations. At test time, the model extracts the logits at iteration t from the representation network at location $$\underset{i,j}{\mathrm{argmax}}(\tilde{R}_{ij}^t).$$

The final prediction can be obtained, for example, by averaging the extracted logits across all iterations.

Example Training Procedures

The models described herein can be trained based on a set of training data that includes, for example, example training inputs that are labeled with a ground truth classification. For example, the ground truth classification can apply to the input as a whole, rather than to specific portions of the input. As one example, the ImageNet dataset can be divided into training and validation subsets and then used to train and validate the model. For example, the model can be trained on the training subset and hyperparameters can be chosen based on the validation subset. All results can then be computed on a separate test subset.

According to an aspect of the present disclosure, a three step training procedure can be performed using only the training class labels as supervision. First, the representation model (e.g., representation network) can be pretrained. As one example, the representation model (e.g., representation network) can be pretrained by optimizing the following objective:

$$J(\theta) = -\log\left(\frac{\prod_{i=1}^{h} \prod_{j=1}^{w} P_\theta(y_{target} \mid X^{ij})^{\frac{1}{hw}}}{\sum_{k=1}^{c} \prod_{i=1}^{h} \prod_{j=1}^{w} P_\theta(y_k \mid X^{ij})^{\frac{1}{hw}}}\right) + \frac{\lambda}{2} \sum_{i=1}^{N} \theta_i^2 \quad (4)$$

where $X^{ij} \in R^{63 \times 63 \times 3}$ is the image patch at location (i, j) $y_{target}$ is the target class, c=1000 is the number of classes, θ are the representation model parameters, and Aλ is a hyperparameter. This objective is simply the cross entropy loss computed based on the average logits across all possible locations plus $\ell^2$-regularization on the model weights.

Second, the attention model can be pre-trained to emit glimpse locations ordered by descending order of maximum logit. As one example, the following objective can be optimized:

$$J(\eta) = -\log\left(\prod_{t=1}^{T} \pi_{\theta,\eta}(l_{target}^t \mid X, C^{t-1})\right) + \frac{\nu}{2} \sum_{i=1}^{N} \eta_i^2 \quad (5)$$

where a $l_{target}^t$ is the $t^{th}$ sorted target location, i.e., $l_{target}^0$ is the location with largest maximum logit, and $l_{target}^{361}$ is the location with the smallest maximum logit. $\pi_{\theta,\eta}(l_{target}^t \mid X, C^{t-1})$ is the probability the model gives for attending to location a $l_{target}^t$ at iteration t given the input image $X \in R^{224 \times 224 \times 3}$ and cell state $C^{t-1}$, i.e. $\tilde{R}_{ij}^t$ where $(i,j)=l_{target}^t$. The parameters η are the weights of the attention model. For this step, one example setting is T=12.

Finally, the whole model can be trained to maximize the expected reward, where the reward (r∈{0,1}) represents whether the model final prediction after 6 glimpses (T=6) is correct. In particular, in some implementations, the training system can use the REINFORCE loss for discrete policies, cross entropy loss and $\ell^2$-regularization. The parameter update is given by the gradient of the objective:

$$J(\theta, \eta) = -\sum_{s=1}^{S}\left(\log\left(\prod_{t=1}^{T} \pi_{\theta,\eta}(l_s^t \mid X, C_s^{t-1})\right)\right)(r_s - b) + \frac{\nu}{2} \sum_{i=1}^{N} \eta_i^2 - \log\left(\frac{\prod_{t=1}^{T} P_\theta(y_{target} \mid X^t)^{1/T}}{\sum_{k=1}^{c} \prod_{t=1}^{T} P_\theta(y_k \mid X^t)^{1/T}}\right) + \frac{\lambda}{2} \sum_{i=1}^{N} \theta_i^2 \quad (6)$$

where S=2 such that two trajectories $l_s$ are sampled at each time from a categorical distribution with location probabilities given by $\pi_{\theta,\eta}(l \mid X, C_s^{t-1})$, b is the average accuracy of the model computed on each minibatch, and $X^t$ denotes the image patch sampled at iteration t. The role of adding b and the S Monte Carlo samples is to reduce variance in the gradient estimates.

As example hyperparameter settings, in each of the above steps, the model can be trained for 120 epochs using Nesterov momentum of 0.9.

Example Devices and Systems

Figure 4A:
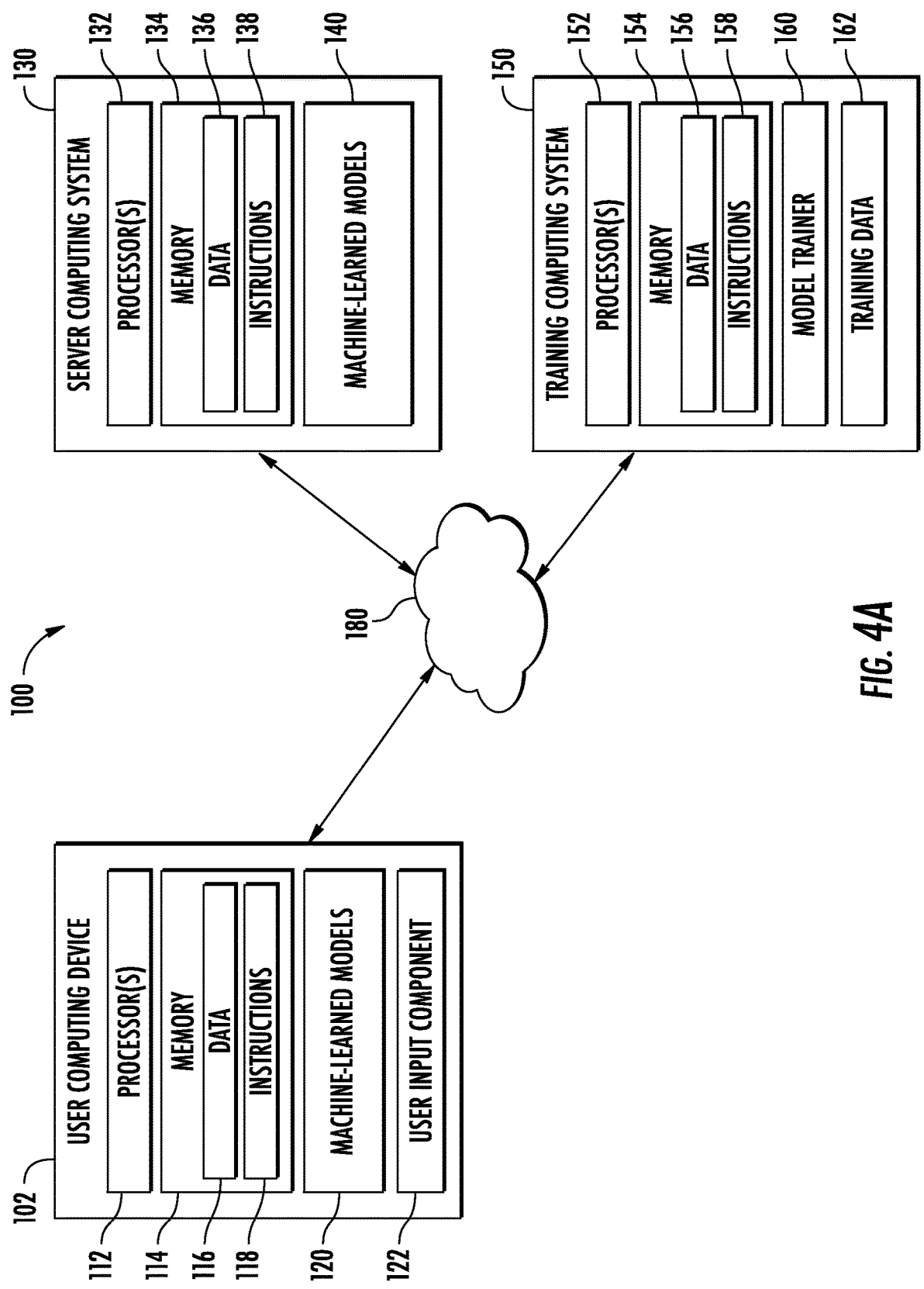
FIG. 4A depicts a block diagram of an example computing system according to example embodiments of the present disclosure.

FIG. 4A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 1-3.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel classification across multiple instances of different inputs).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., an image classification service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1-3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained. In another example, the model trainer 160 can perform reinforcement learning techniques in which a reward is provided based on an action selected through application of a policy.

In particular, the model trainer 160 can train the machine-learned models 120 and/or 140 based on a set of training data 162. The training data 162 can include, for example, inputs that are labeled with a ground truth classification. The inputs can be image inputs, text inputs, and/or audio inputs. In some implementations, the ground truth classification can apply to the input as a whole (e.g., not to certain respective portions of the input).

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 4A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 4B:
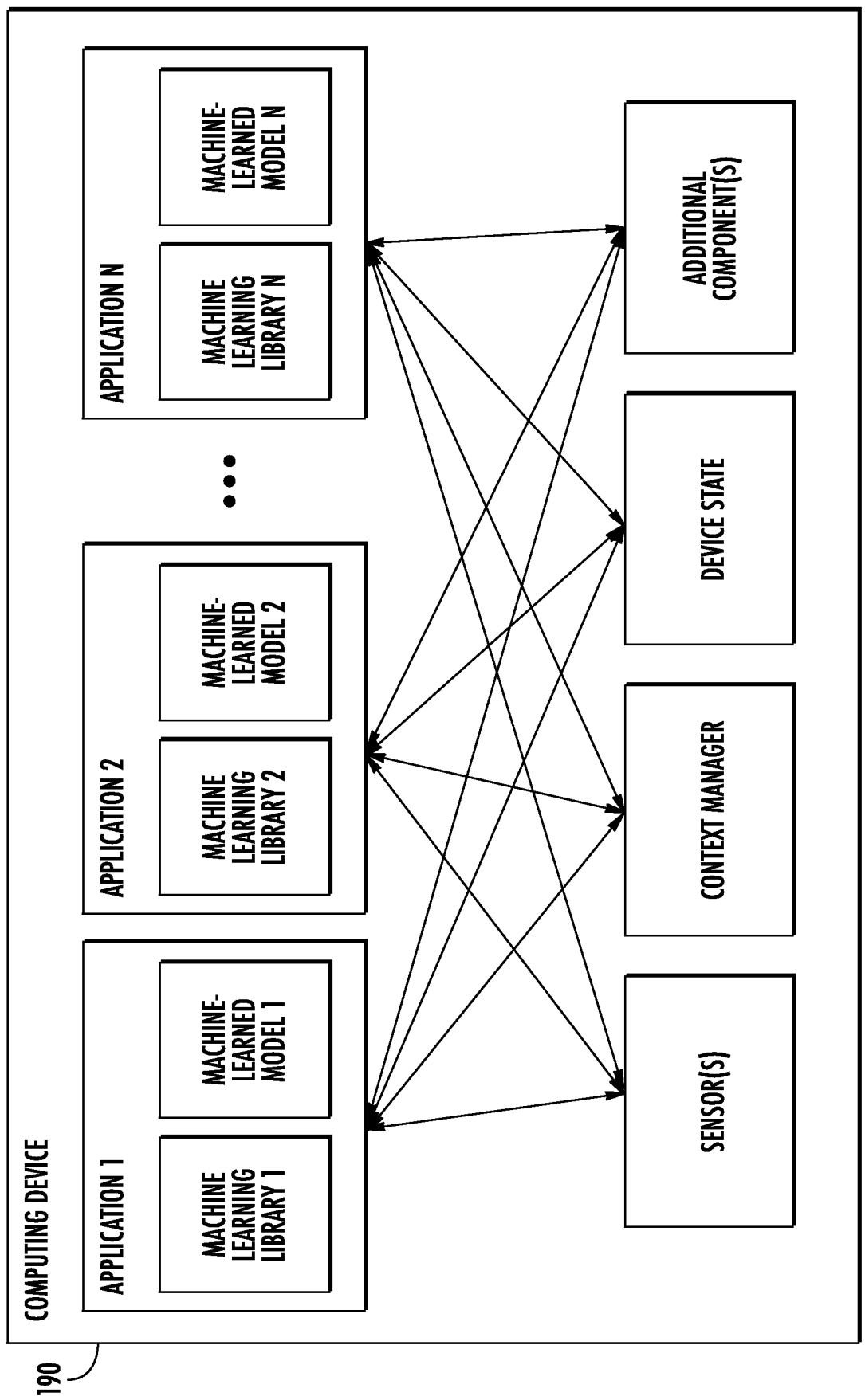
FIG. 4B depicts a block diagram of an example computing device according to example embodiments of the present disclosure.

FIG. 4B depicts a block diagram of an example computing device 190 according to example embodiments of the present disclosure. The computing device 190 can be a user computing device or a server computing device.

The computing device 190 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
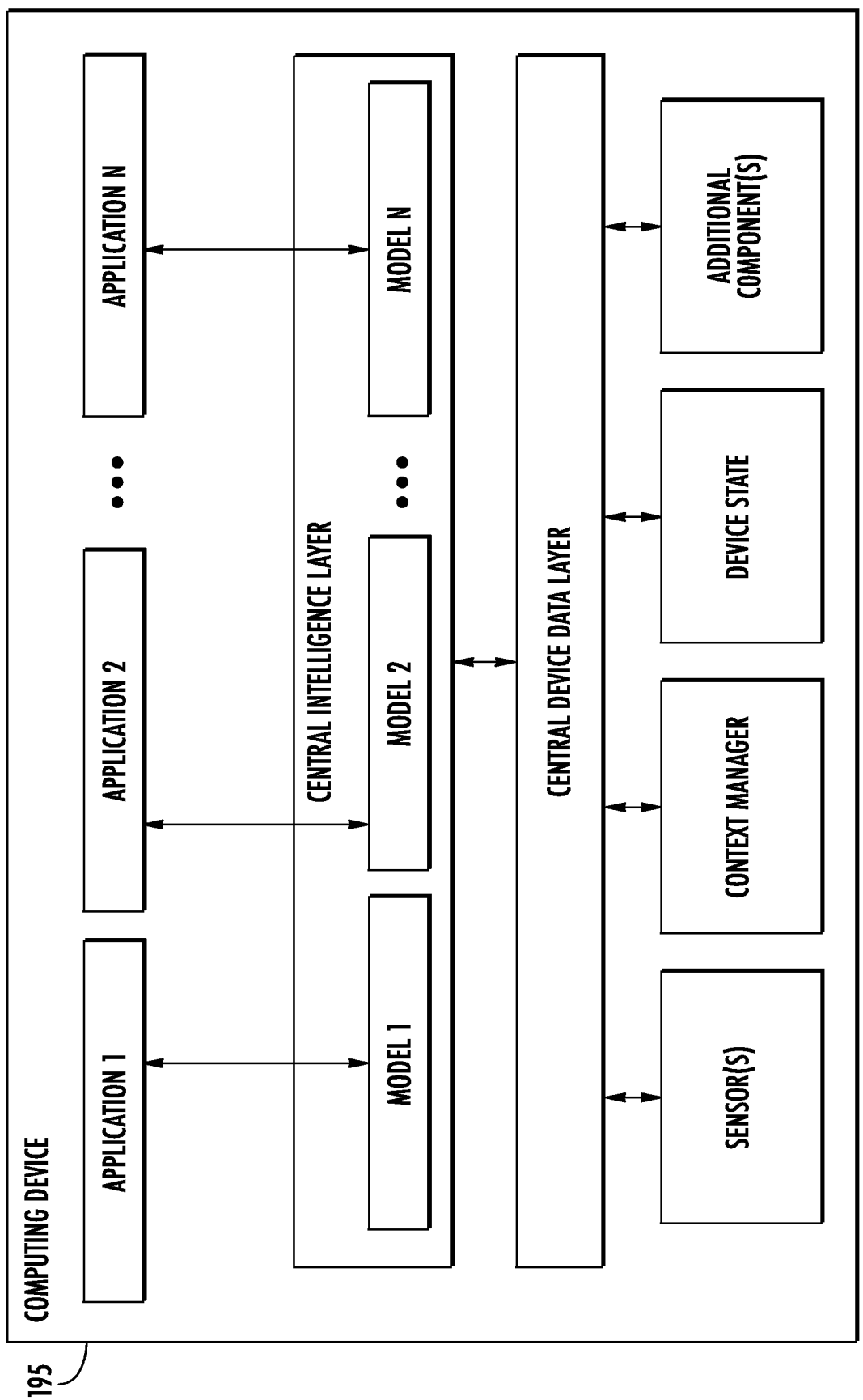
FIG. 4C depicts a block diagram of an example computing device according to example embodiments of the present disclosure.

FIG. 4C depicts a block diagram of an example computing device 195 according to example embodiments of the present disclosure. The computing device 195 can be a user computing device or a server computing device.

The computing device 195 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 195.

The central intelligence layer can communicate with a central device data layer. The central device data layer can be a centralized repository of data for the computing device 195. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 5:
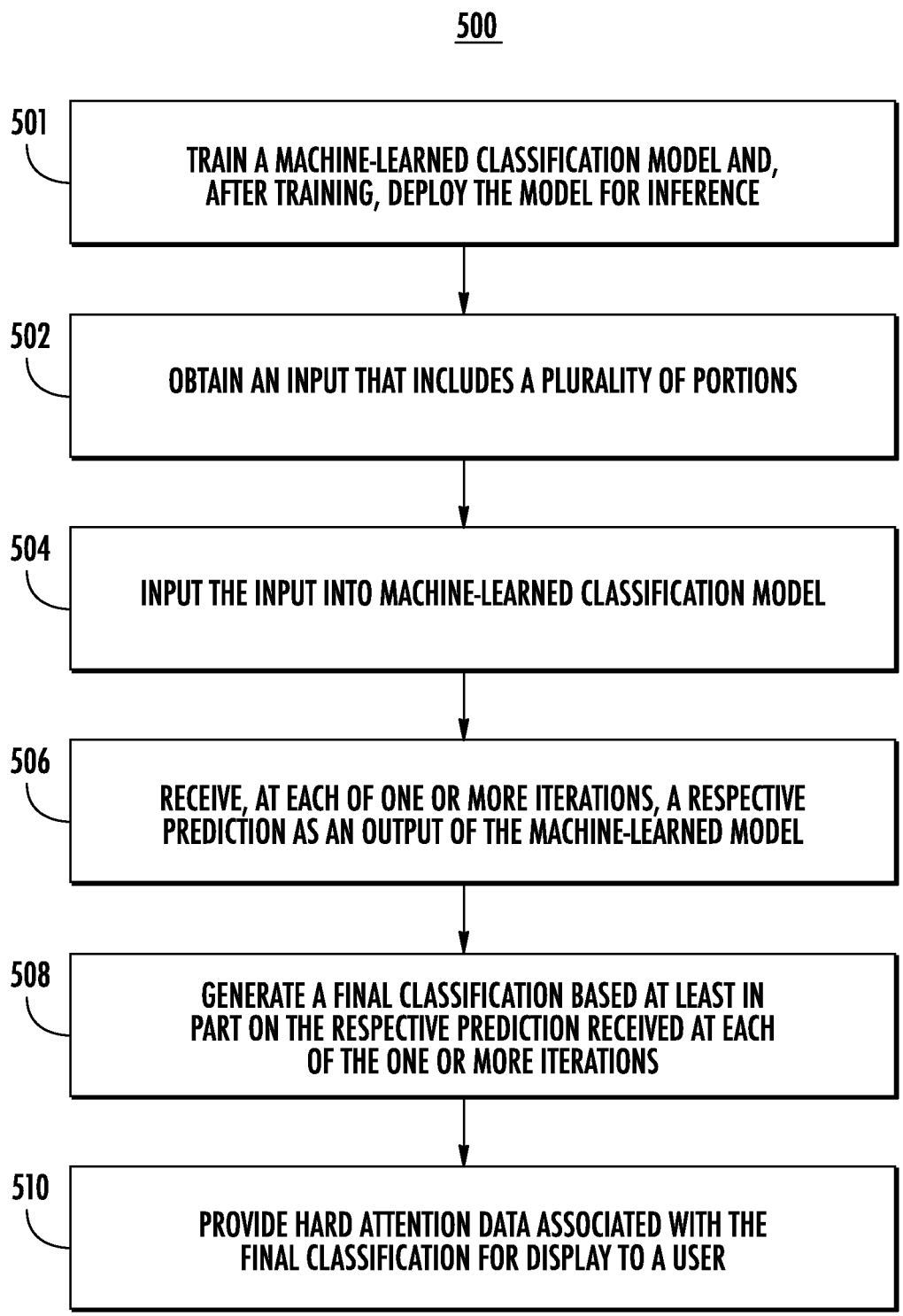
FIG. 5 depicts a flow chart diagram of an example method to train and use a machine-learned classifier model with hard attention according to example embodiments of the present disclosure.

FIG. 5 depicts a flow chart diagram of an example method to perform according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 501, a computing system can train a machine-learned classification model. For example, the machine-learned classification model can have the structure illustrated and discussed with reference to FIGS. 1, 2, and/or 3.

In one example, training the model at 501 can include training the machine-learned classification model in multiple stages. As one example, at a first stage, the computing system can jointly train the representation model and the classification model using a first objective function. For example, the first objective function can evaluate a difference between a ground truth classification label for the input and the respective classification data produced for each of the plurality of portions of the input.

As another example, at a second stage, the computing system can train the attention model using a second objective function. For example, the second objective function can evaluate an ability of the attention model to select the attended portions according to a confidence ordering that is based on the respective classification data produced by the classification model.

As another example, at a third stage that follows the first stage and the second stage, the computing system can train the machine-learned classification model using a third objective function. For example, the third objective function can be or include a reward function that provides a reward with magnitude based on whether a final classification produced from the respective predictions matches a ground truth classification for the input.

After training the model, the computing system can deploy the model for inference (e.g., which can include performance of blocks 502-510).

At 502, the computing system can obtain an input that includes a plurality of portions. At 504, the computing system can input the input into the machine-learned classification model. At 506, the computing system can receive, at each of one or more iterations, a respective prediction as an output of the machine-learned model.

At 508, the computing system can generate a final classification based at least in part on the respective prediction received at each of the one or more iterations. As one example, generating the final classification can include averaging the respective predictions received for the one or more iterations to obtain an averaged prediction; and selecting a highest scoring class from the averaged prediction as the final classification. Other combinations of the respective predictions can be performed as well. For example, a highest scoring class can be selected and then only the attended portions associated with such class can be provided for use as the final classification. In yet another example, a second, more powerful classification model can be applied to an additional input generated through extraction and aggregation of the attended portions (e.g., only the portions of the original input image that were selected) to generate the final classification. The second model can operate on each attended portion individually and/or on the aggregate additional input.

Figure 6:
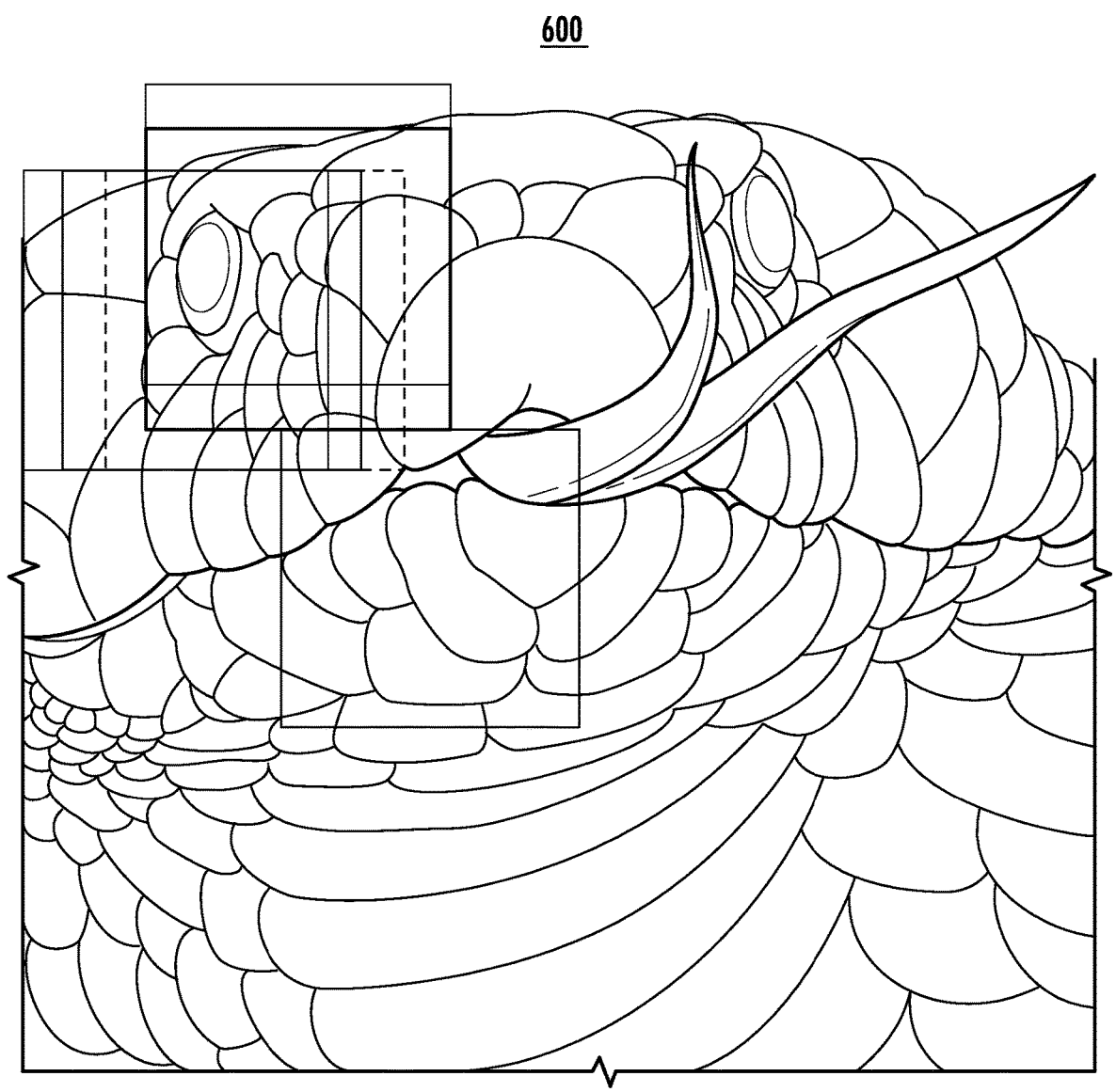
FIG. 6 illustrates an example input image.

At 510, the computing system can provide hard attention data associated with the final classification for display to a user. For example, the hard attention data can identify the attended portions of the input selected at each of the one or more iterations. As one example, FIG. 6 illustrates an example input image 600. A final classification of 'Indian Cobra' has been generated from the image 600, with hard attention shown via boxes around the relevant attended image portions.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Although the models described herein have been discussed primarily with reference to classification, they can also be applied to other machine learning tasks including other computer vision or image processing tasks such as object detection, facial recognition, or similar tasks.

What is claimed is:

1. A computer system that performs classification with hard attention, the computer system comprising:
    a machine-learned classification model, comprising:
        a representation model configured to receive and process an input that comprises a plurality of portions to generate a plurality of sets of features respectively for the plurality of portions of the input;
        a classification model configured to receive and process the plurality of sets of features to generate respective classification data for each of the plurality of portions of the input; and
        an attention model configured to receive and process the plurality of sets of features to select, at each of one or more iterations, an attended portion of the plurality of portions of the input;
        wherein, at each of the one or more iterations, the machine-learned classification model is configured to output a respective prediction that comprises the respective classification data for the attended portion of the input selected by the attention model at such iteration;
    one or more processors; and
    one or non-transitory computer-readable media that store instructions that, when executed by the one or more processors cause the computer system to perform operations, wherein the operations comprise:
        obtaining the input that comprises the plurality of portions;
        inputting the input into the machine-learned classification model; and
        receiving, at each of the one or more iterations, the respective prediction as an output of the machine-learned classification model.

2. The computer system of claim 1, wherein the operations further comprise:
    generating a final classification, wherein generating the final classification comprises:
        averaging the respective predictions received for the one or more iterations to obtain an averaged prediction; and
        selecting a highest scoring class from the averaged prediction as the final classification.

3. The computer system of claim 1, wherein the operations further comprise:
providing hard attention data for display to a user, wherein the hard attention data identifies the attended portions of the input selected at each of the one or more iterations.

4. The computer system of claim 1, wherein the attention model comprises:
an attention network configured to receive and process the plurality of sets of features to produce an intermediate attention representation; and
a saccader cell that is configured to, at each of the one or more iterations:
obtain the intermediate attention representation;
obtain a cell state associated with a most recent iteration, wherein the cell state identifies portions that have been selected as attended portions in previous iterations;
combine the intermediate attention representation and the cell state associated with the previous iteration to produce a location probability distribution over the plurality of portions of the input;
select the attended portion based on the location probability distribution; and
update the cell state for use in a next iteration based on the attended portion.

5. The computer system of claim 4, wherein the attention network is configured to:
receive an intermediate classification representation produced by the classification model; and
produce the intermediate attention representation based at least in part on the plurality of sets of features and the intermediate classification representation.

6. The computer system of claim 4, wherein the saccader cell is configured to combine the intermediate attention representation and the cell state associated with the previous iteration such that the location probability distribution is effectively zero for portions that have been selected as attended portions in previous iterations.

7. The computer system of claim 1, wherein the input comprises an image and wherein the plurality of portion of the input comprise a plurality of patches of the image.

8. The computer system of claim 7, wherein the plurality of patches of the image are at least partially overlapping.

9. The computer system of claim 1, wherein the input comprises a textual input descriptive of text, an audio input descriptive of audio, or sensor data input descriptive of data generated by one or more sensors.

10. The computer system of claim 1, wherein the representation model comprises a first convolutional neural network, the classification model comprises a second convolutional neural network, and the attention model comprises a third convolutional neural network.

11. The computer system of claim 1, wherein the respective classification data produced by the classification model for each of the plurality of portions of the input comprises a logit vector that provides values for each of a number of candidate classification labels.

12. The computer system of claim 1, wherein the operations further comprise training the machine-learned classification model in multiple stages, wherein training the machine-learned classification model in multiple stages comprises:
at a first stage, jointly training the representation model and the classification model using a first objective function;
at a second stage, training the attention model using a second objective function; and
at a third stage that follows the first stage and the second stage, training the machine-learned classification model using a third objective function.

13. The computer system of claim 12, wherein the first objective function evaluates a difference between a ground truth classification label for the input and the respective classification data produced for each of the plurality of portions of the input.

14. The computer system of claim 12, wherein the second objective function evaluates an ability of the attention model to select the attended portions according to a confidence ordering that is based on the respective classification data produced by the classification model.

15. The computer system of claim 12, wherein the third objective function comprises a reward function that provides a reward with magnitude based on whether a final classification produced from the respective predictions matches a ground truth classification for the input.

16. The computer system of claim 1, wherein the one or more iterations comprise a plurality of iterations.

17. A computer-implemented method comprising:
obtaining, by a computing system comprising one or more computing devices, an input that comprises a plurality of portions;
inputting, by the computing system, the input into a machine-learned classification model, wherein the machine-learned classification model comprises:
a representation model configured to receive and process an input that comprises a plurality of portions to generate a plurality of sets of features respectively for the plurality of portions of the input;
a classification model configured to receive and process the plurality of sets of features to generate respective classification data for each of the plurality of portions of the input; and
an attention model configured to receive and process the plurality of sets of features to select, at each of one or more iterations, an attended portion of the plurality of portions of the input;
wherein, at each of the one or more iterations, the machine-learned classification model is configured to output a respective prediction that comprises the respective classification data for the attended portion of the input selected by the attention model at such iteration; and
receiving, by the computing system, at each of the one or more iterations, the respective prediction as an output of the machine-learned classification model.

18. The method of claim 17, wherein the method further comprises:
generating, by the computing system, a final classification, wherein generating the final classification comprises:
averaging, by the computing system, the respective predictions received for the one or more iterations to obtain an averaged prediction; and
selecting, by the computing system, a highest scoring class from the averaged prediction as the final classification.

19. The method of claim 17, wherein the method further comprises:
providing, by the computing system, hard attention data for display to a user, wherein the hard attention data identifies the attended portions of the input selected at each of the one or more iterations.

20. One or more non-transitory computer-readable media that store instructions that, when executed by a computing system comprising one or more computing devices cause the one or more computing devices to perform operations, the operations comprising:
- obtaining, by the computing system, an input that comprises a plurality of portions;
- inputting, by the computing system, the input into a machine-learned classification model, wherein the machine-learned classification model comprises:
  - a representation model configured to receive and process an input that comprises a plurality of portions to generate a plurality of sets of features respectively for the plurality of portions of the input;
  - a classification model configured to receive and process the plurality of sets of features to generate respective classification data for each of the plurality of portions of the input; and
  - an attention model configured to receive and process the plurality of sets of features to select, at each of one or more iterations, an attended portion of the plurality of portions of the input;
  - wherein, at each of the one or more iterations, the machine-learned classification model is configured to output a respective prediction that comprises the respective classification data for the attended portion of the input selected by the attention model at such iteration; and
- receiving, by the computing system, at each of the one or more iterations, the respective prediction as an output of the machine-learned classification model.

* * * * *